US008258993B2

(12) United States Patent
Inoue et al.

(10) Patent No.: US 8,258,993 B2

(45) Date of Patent: Sep. 4, 2012

(54) REMOTE-CONTROLLED LIGHT RECEIVING STRUCTURE OF ELECTRIC ROLL SCREEN FOR BLIND

(75) Inventors: Takuya Inoue, Hyogo (JP); Mutsumasa Funaishi, Hyogo (JP)

(73) Assignee: Shinsei Seiki Co., Ltd. (JP)

( * ) Notice: Subject to any disclaimer, the term of this patent is extended or adjusted under 35 U.S.C. 154(b) by 486 days.

(21) Appl. No.: 12/377,319

(22) PCT Filed: Sep. 25, 2007

(86) PCT No.: PCT/JP2007/069318

§ 371 (c)(1), (2), (4) Date: Jan. 29, 2010

(87) PCT Pub. No.: WO2008/075494

PCT Pub. Date: Jun. 26, 2008

(65) Prior Publication Data

US 2010/0134339 A1 Jun. 3, 2010

(30) Foreign Application Priority Data

Dec. 19, 2006 (JP) ................................ 2006-341561

(51) Int. Cl.
*H04L 17/02* (2006.01)

(52) U.S. Cl. ....................................... 341/176; 160/310

(58) Field of Classification Search .................. 341/176; 160/310
See application file for complete search history.

(56) References Cited

U.S. PATENT DOCUMENTS 4,372,367 A * 2/1983 Baldanello et al. ........... 160/310
5,044,417 A * 9/1991 Bresson ........................ 160/310
5,799,716 A * 9/1998 Yamaguchi et al. .......... 160/310

FOREIGN PATENT DOCUMENTS

JP 10-046964 2/1998

* cited by examiner

*Primary Examiner* — Khai M Nguyen

(74) *Attorney, Agent, or Firm* — Studebaker & Brackett PC; Donald R. Studebaker

(57) ABSTRACT

A take-up pipe 1 is placed along an upper edge of a window of a building and is rotatably supported by side brackets 2R. An upper end of the screen having a weight bar attached to a lower end thereof, is fixed to the take-up pipe, so that the take-up pipe is rotated in forward and reverse directions by a motor 5 to wind up and down the screen. A light receiving unit 27 to receive a pulsed optical signal applied from a remote controller is mounted on the side bracket and is arranged so that it can be switched to two different orientations where the light receiving directions are symmetric with respect to a vertically downward direction and the phases are different from each other. By virtue of this, irrespective of the installation constraint of the electric roll screen, the remote-control of the electric roll screen can be effected.

4 Claims, 13 Drawing Sheets

REMOTE-CONTROLLED LIGHT RECEIVING STRUCTURE OF ELECTRIC ROLL SCREEN FOR BLIND

TECHNICAL FIELD

The present invention relates to a remote-controlled light receiving structure of an electric roll screen for blind mounted on a window of a building.

BACKGROUND ART

In general, an electric roll screen for blind as is disclosed by JP Laid-open (Unexamined) patent publication No. Hei 10-46964, for example, is known as this type one which is structured so that a take-up pipe mounted along an upper edge of a window of a building is rotatably supported at both ends thereof by side brackets (or side plates), while an upper end of the screen as a window shade is fixed to the take-up pipe and a weight bar is attached to a lower end of the screen, so that the take-up pipe is rotated in forward and reverse directions by a motor to wind up and down the screen. In this type one, the motor is placed in the take-up pipe or at some other place outside the take-up pipe, for example, at either of the side brackets.

The electric roll screen may be adapted to be remote-controlled with a remote controller. This type one requires the mounting of a light receiving unit to receive a pulsed optical signal applied from the remote controller, and there are two mounting methods, i.e., an inside mounting method wherein the light receiving unit is built in the side bracket or in the mounting frame, and an outside mounting method wherein the light receiving unit is mounted on a wall of the building or the like separate from the side bracket or the mounting frame.

Of these conventional mounting methods, the inside mounting method has the disadvantage that the electric roll screen cannot be remote-controlled with the remote controller, depending on orientations of the light receiving unit. For example, in the case where the light receiving unit is mounted on a lateral end of the side bracket, when the electric roll screen is set with the light receiving unit orientated toward an inside of a room, no remote-control-operation problem is presented, but when the electric roll screen is set with the light receiving unit orientated toward a wall of the room under interior layout constraint and the like, it cannot be remote-controlled with the remote controller. Also, when the light receiving unit is mounted on a lower end surface of the side bracket, the electric roll screen cannot be remote-controlled from a location apart from the window of the building where the electric roll screen is mounted.

On the other hand, the outside mounting method involves the mounting of the light receiving unit and the connection of wires between the light receiving unit and a control panel fixed to the mounting frame and the like, thus involving the problems that it takes a lot of time and labor with the mounting and wiring works and also the appearance is spoiled by the wires.

DISCLOSURE OF INVENTION

In the light of these disadvantages, the present invention has been made. It is an object of the present invention to provide a remote-controlled light receiving structure of an electric roll screen for blind which can effect the remote control operation and enhance the convenience effectively, irrespective of installation constraint of the electric roll screen, by improving the inside mounting method wherein the light receiving unit is mounted at the side bracket, in particular.

To accomplish the object of the invention mentioned above, the present invention provides an improvement of an electric roll screen for blind which is structured so that a take-up pipe is placed along an upper edge of a window of a building and is rotatably supported at both ends thereof by side brackets, while an upper end of the screen having a weight bar attached to a lower end thereof is fixed to the take-up pipe, so that the take-up pipe is rotated in forward and reverse directions by a motor to wind up and down the screen. The present invention is characterized in that a light receiving unit to receive a pulsed optical signal applied from a remote controller is mounted on one of the side brackets and is arranged so that it can be switched to two different orientations where the light receiving directions are symmetric with respect to a vertically downward direction and the phases are different from each other.

In this structure, even when the electric roll screen is set in reverse under interior layout constraint and the like, the light receiving unit can be changed in light receiving direction and thereby it can be oriented toward the inside of the room as normal. Thus, irrespective of the installation constraint of the electric roll screen, the electric roll screen can be remote-controlled by the remote controller even from a location in the room spaced apart from it, thus enhancing convenience. In addition, since the light receiving unit is only switched in two directions to change or switch the light receiving direction, the structure for the direction change can be relatively simplified, thus facilitating to practice.

In the present invention, it is preferable that the motor is placed in the take-up pipe and also is supported by one of the side brackets through a limit case, and one end portion of the take-up pipe is supported to be freely rotatable around an outside surface of the limit case.

In this structure, since the motor is placed in the take-up pipe and also is supported by the side bracket through the limit case, the side bracket can be reduced in thickness, as compared with the structure wherein the motor is mounted on the side bracket. This can contribute to installation-space-saving and thus enhancement of versatility.

In the present invention, it is further preferable that a bracket cover having, at a lower end thereof, a transparent, circular-arc-shaped, light receiving surface is mounted on an outside surface of the side bracket and a light receiving unit holder for holding the light receiving unit is mounted on the bracket cover so that it can pivot about a center point of the circular-arc-shaped light receiving surface, and the light receiving unit is adapted to receive the pulsed optical signal applied from the remote controller through the circular-arc-shaped light receiving surface of the bracket cover.

In this structure, since the light receiving unit holder is rotatably mounted on the bracket cover fixed to the outside surface of the side bracket and also the light receiving unit held by that light receiving unit holder is structured so that it can constantly receive a pulsed optical signal applied from the remote controller through the transparent, circular-arc-shaped, light receiving unit cover mounted on the lower end of the bracket cover, irrespective of the change of the light receiving direction, the light receiving unit can be protected by the light receiving unit cover. Also, sensitivity of the light receiving unit can be prevented from being varied by the change in the light receiving direction of the light receiving unit, thus enhancing reliability.

In the present invention, it is still further preferable that the light receiving unit holder has one end surface formed to extend through a fitting hole formed in the bracket cover and face outside and also has an operating slot formed in the one end surface for rotationally operating the light receiving unit holder.

In this structure, the light receiving direction of the light receiving unit can be easily switched with for example a driver and the like which is inserted in the operating slot formed in the one end surface of the light receiving unit holder extending through the fitting hole of the bracket cover and facing outside and is operated rotationally, thus contributing to simplification of the installation operation.

In the present invention, it is further preferable that the bracket cover has, in an inner surface thereof, projecting portions formed at two locations on opposite sides of the fitting hole, one on each side, and the light receiving unit holder has two holding portions formed to correspond to the projecting portions, respectively, each holding portion comprising a first holding lug having flexibility and a second holding lug having no flexibility and being structured so that when the light receiving unit is changed in light receiving direction by operating the light receiving unit holder rotationally, the first holding lug of one of the holding portions is brought into contact with the corresponding projecting portion of the bracket cover and is bent to allow relative rotation and shift of the projecting portion, first, and, then, the second holding lug is brought into contact with that projecting portion to prevent the relative rotation and shift of the projecting portion, while at the same time as that, the projecting portion is held in sandwich relation by the first holding lug and the second holding lug, to maintain the changed light receiving direction of the light receiving unit.

In this structure, when the light receiving direction of the light receiving unit is switched by rotationally operating the light receiving unit holder fitted in the fitting hole of the bracket cover, the projecting portion on the bracket cover side is held in sandwich relation by the first holding lug and the second holding lug of the holding portion located on the light receiving unit holder side and thereby the light receiving direction of the light receiving unit switched is maintained. Thus, the direction change operation of the light receiving unit can be done easily and reliably, thus providing a beneficial effect for putting the present invention into practice.

BEST MODE FOR CARRYING OUT THE INVENTION

In the following, an embodiment of the present invention which is a best mode for carrying out the invention will be described with reference to the accompanying drawings.

Figure 1:
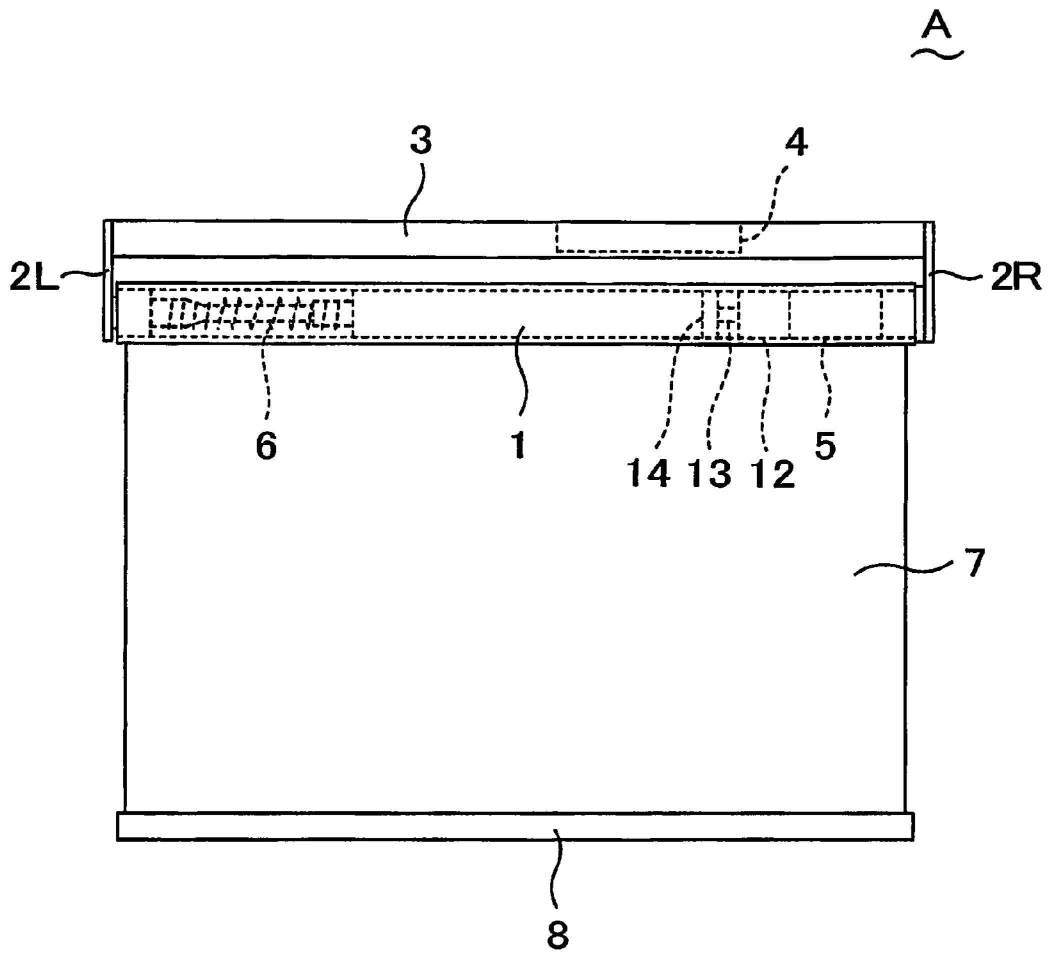
FIG. 1 is a schematic view of an overall structure of an electric roll screen for blind according to an embodiment of the present invention.

FIG. 1 shows an overall structure of an electric roll screen for blind having a remote-controlled light receiving structure according to an embodiment of the present invention. The electric roll screen A is provided with a take-up pipe 1 placed along an upper edge of a window of a building. The take-up pipe 1 is rotatably supported at both ends thereof by right and left side brackets 2R, 2L. Upper ends of the side brackets 2L, 2R are connected to a mounting frame 3 fixed to a ceiling or a side wall of a building, and a control panel 4 is mounted on an inner side of the mounting frame 3. While the side brackets 2L, 2R are illustrated to be exposed in FIG. 1, they are actually covered with bracket covers 25, respectively (See FIG. 2 showing the right side bracket 2R only).

A motor 5 for driving the take-up pipe 1 rotationally is placed in the take-up pipe 1 at a location near the side bracket 2R on the right side as viewed in the drawing figure, and a balancer 6 comprising a coiled spring and the like is placed in the take-up pipe 1 near the side bracket 2L on the left side as viewed in the drawing figure. An upper end of a screen 7 which is made from a blind-use texture and has a width slightly smaller than a length of the take-up pipe 1 is fixed to the take-up pipe 1, and a weight bar 8 is attached to a lower end of the screen 7. The take-up pipe 1 is rotated in forward and reverse directions by the motor 5 to wind up and down the screen 7, and the balancer 6 operates in accordance with the lowering distance of the screen 7 so that load applied to the motor 5 can be generally equalized irrespective of the lowering distance of the screen 7.

Figure 2:
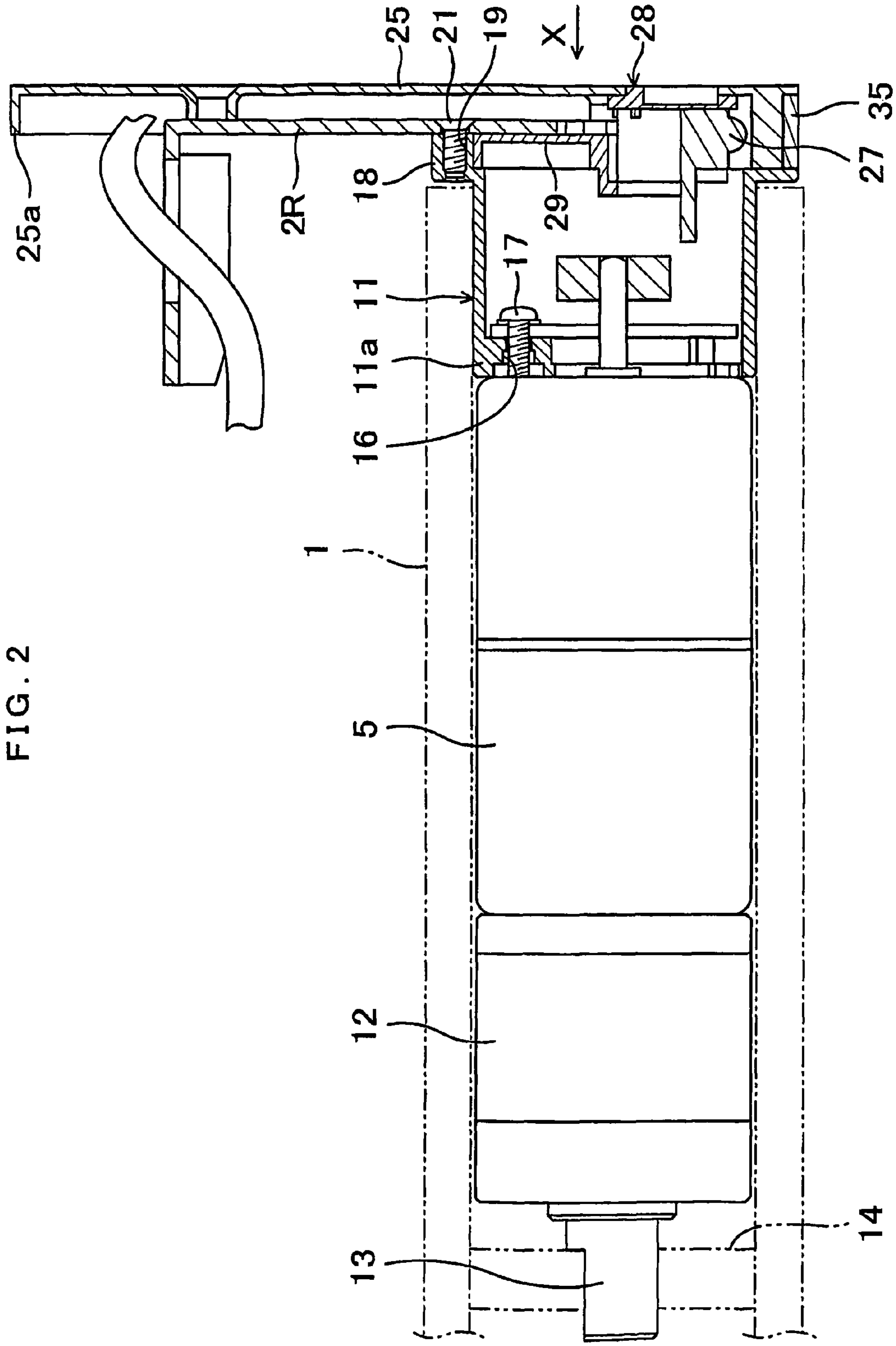
FIG. 2 is a vertical cross-sectional view showing a remote-controlled light receiving structure of the electric roll screen.

As illustrated in detail in FIG. 2, the motor 5 is supported by the right side bracket 2R through a limit case 11 and the take-up pipe 1 is supported so that its one end portion can be freely rotated around an outside surface of the limit case 11. Also, a reduction gear 12 is connected to an output portion of the motor 5 and an output shaft 13 is extended from the reduction gear 12 and is connected to the take-up pipe 1 through a drive wheel 14.

Figure 3:
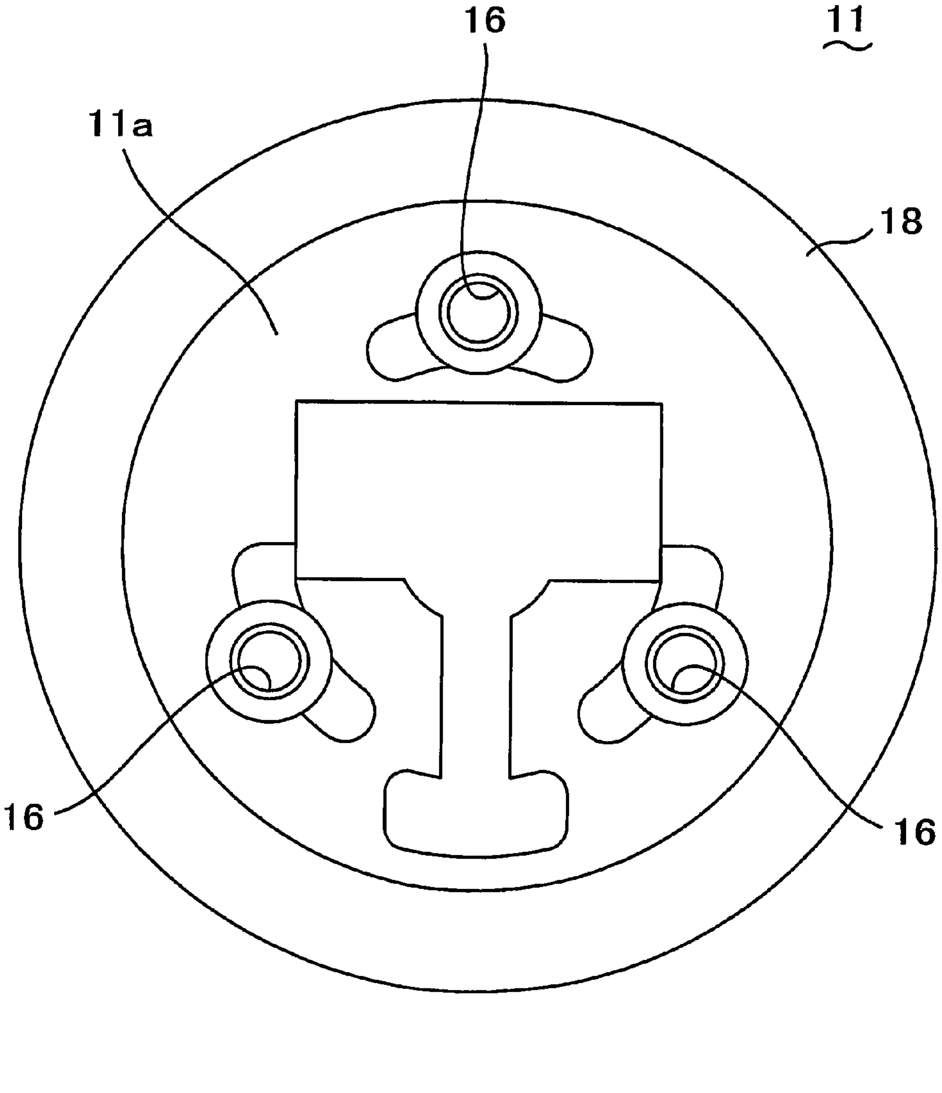
FIG. 3 is a rear view of a limit case as viewed from the motor mounting surface side.
Figure 4:
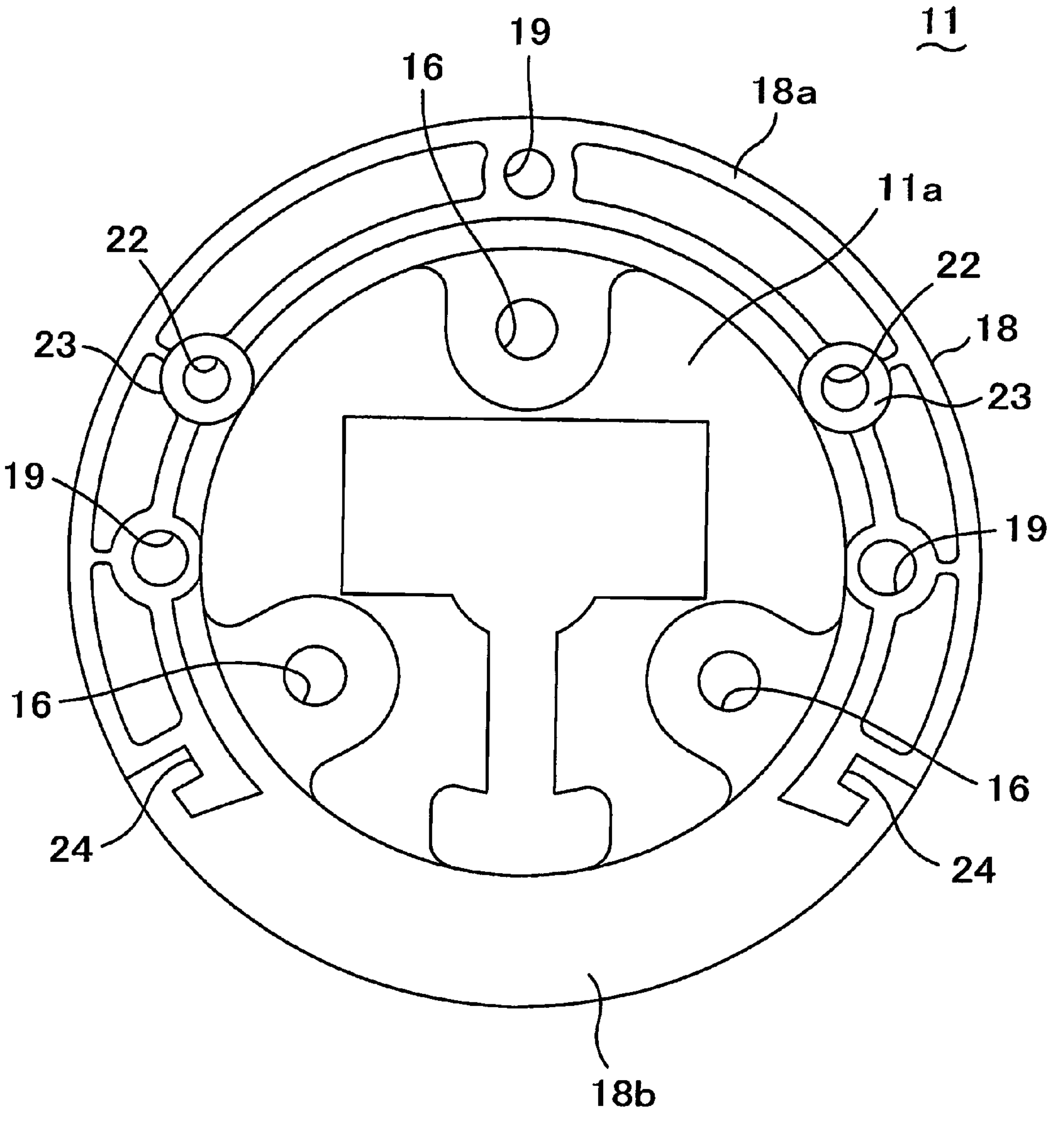
FIG. 4 is a front view of the limit case as viewed from the side bracket mounting surface side.

The limit case 11, which has a closed-end cylinder form, as shown in FIGS. 3 and 4, is connected to the motor 5 with screws 17 inserted in three screw holes 16, 16, 16 formed in a bottom 11*a* of the limit case 11. The limit case 11 has a flange 18 formed around a margin of an aperture of the limit case 11. The flange 18 comprises a high shoulder portion 18*a* formed on an upper side thereof and having large thickness and a low shoulder portion 18*b* formed on a lower side thereof and having small thickness. In the state of the high shoulder portion 18*a* of the flange 18 being in contact with an inner surface of the side bracket 2R, screws 21 are screwed from outside of the side bracket 2R into screw holes 19 formed at three locations in the high shoulder portion 18*a*, so that the limit case 11 and the side bracket 2R are connected to each other. The high shoulder portion 18*a* of the flange 18 has bosses 23 having screw holes 22, respectively, each being formed between two of the three screw holes 19, 19, 19, and projecting from the rest of the high shoulder portion 18*a*. When the limit case 11 and the side bracket 2R are connected, the bosses 23 are fitted in small holes (not shown) formed in the side bracket 2R. Also, the high shoulder portion 18*a* of the flange 18 has, at both ends thereof, retention grooves 24, 24 for retaining a light receiving unit cover 35 mentioned later. The limit case 11 houses therein a motor rotation detecting device, such as an encoder, for detecting rotation of the motor 5, not shown.

Figure 5:
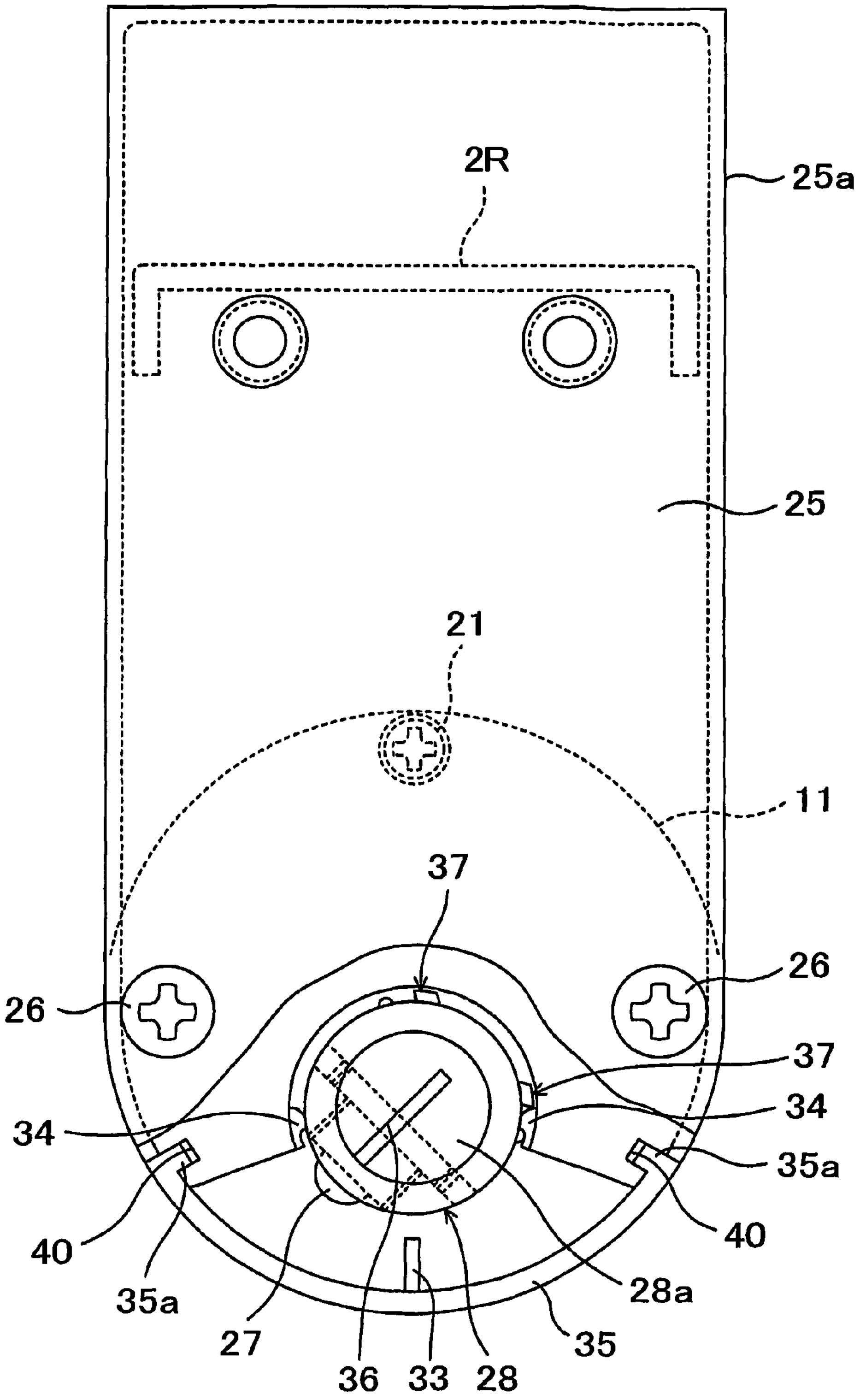
FIG. 5 is an enlarged arrow view party cut as viewed from the direction X of FIG. 2.

A bracket cover 25 of synthetic resin for covering an outside surface of the right side bracket 2R is fixed to the right side bracket 2R with screws 26, as shown in FIG. 5 as well. The screws 26 in an upper portion of the bracket cover 25 are screwed at the locations where the bracket cover 25 and the side bracket 2R are in direct contact with each other, while the screws 26 in a lower portion of the same are screwed at the locations corresponding to the bosses 23 in the flange 18 of the limit case 11. A light receiving unit 27, which comprises a light receiving sensor and the like for receiving a pulsed optical signal, such as infrared light, applied from a remote controller, is fixed to a lower end portion of the bracket cover 25 through a light receiving unit holder 28 and a holder support 29. The light receiving unit 27 is arranged so that it can be switched to two different orientations where the light receiving directions are symmetric with respect to a vertically downward direction and the phases are different from each other at a predetermined angle, such as, for example, about 90°.

Figure 6:
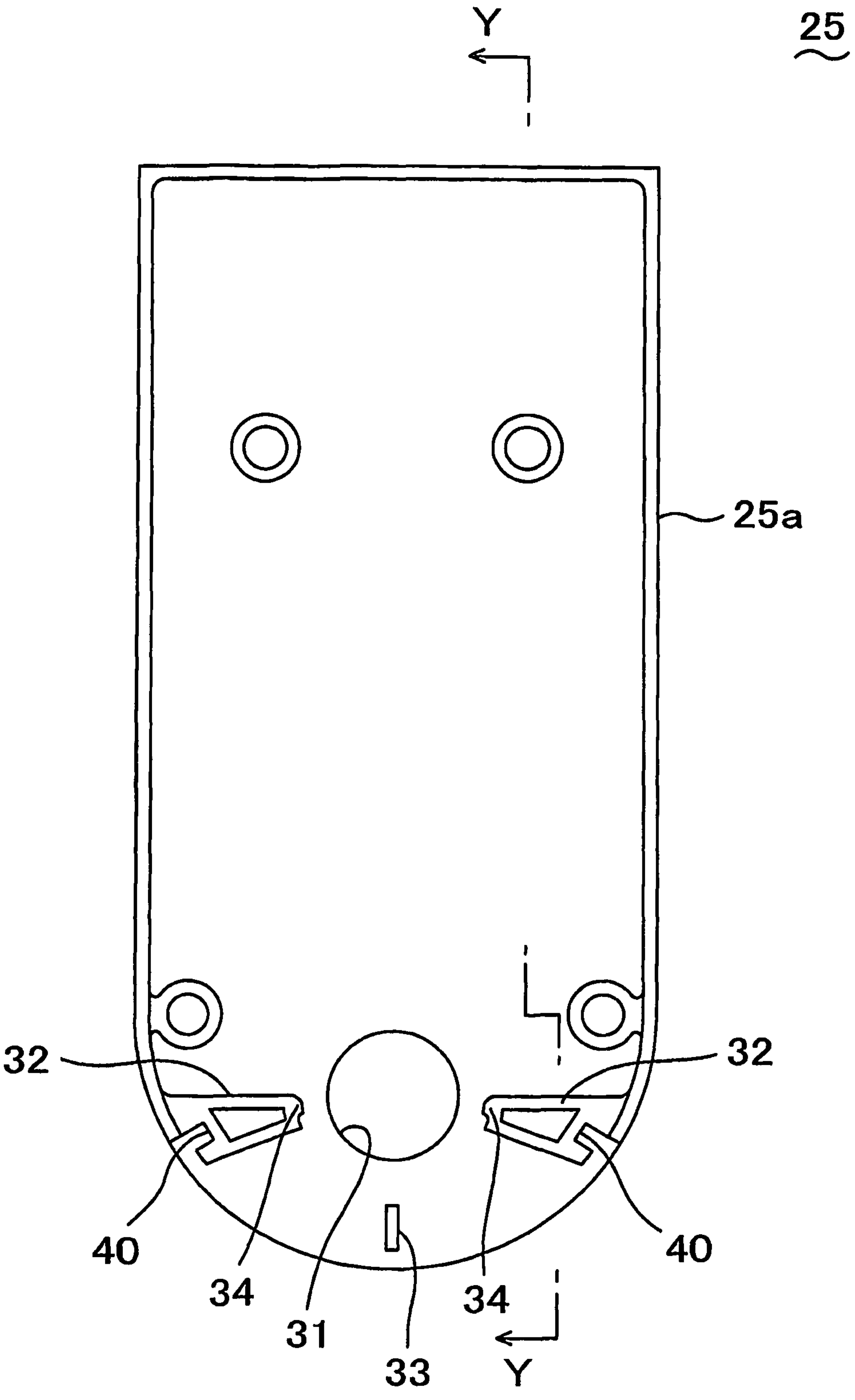
FIG. 6 is a rear view of a bracket cover as viewed from the interior surface side.
Figure 7:
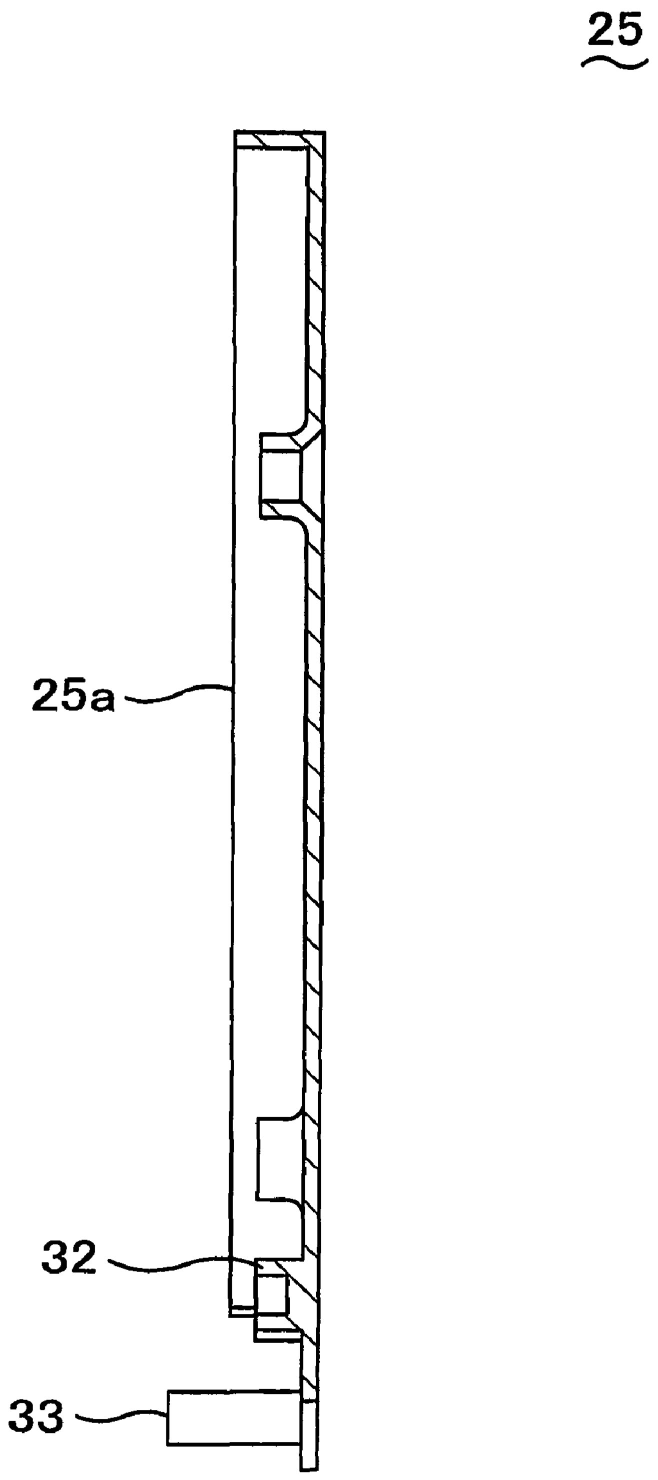
FIG. 7 is a sectional view taken along line Y-Y of FIG. 6.
Figure 8:
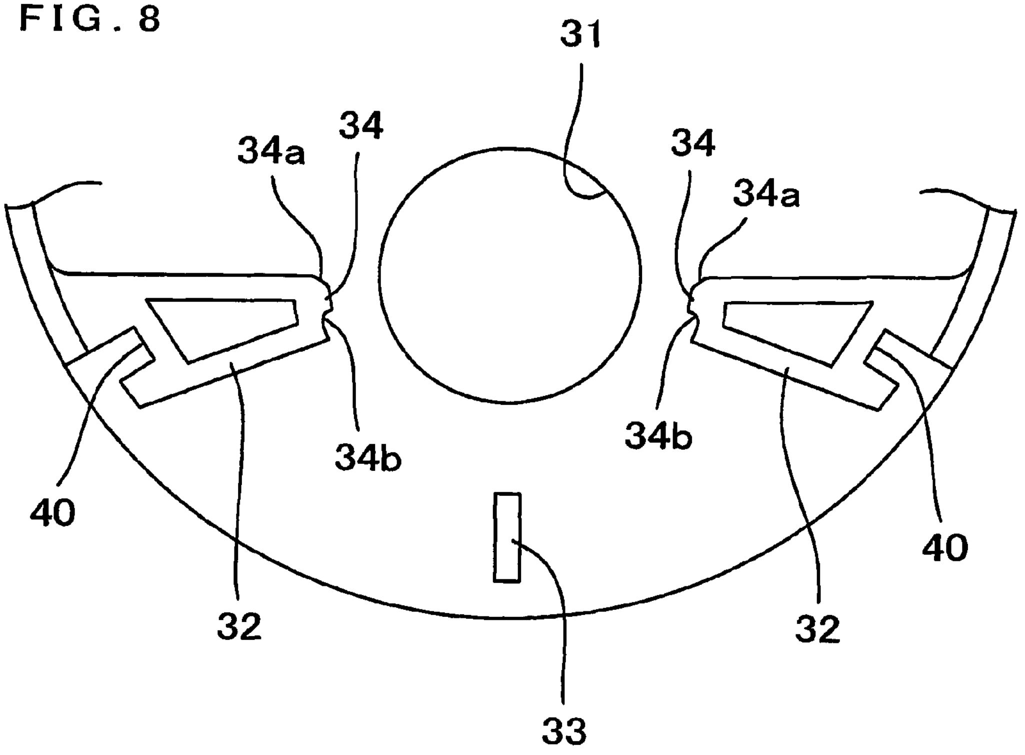
FIG. 8 is an enlarged view around a fitting hole of FIG. 6.
Figure 9:
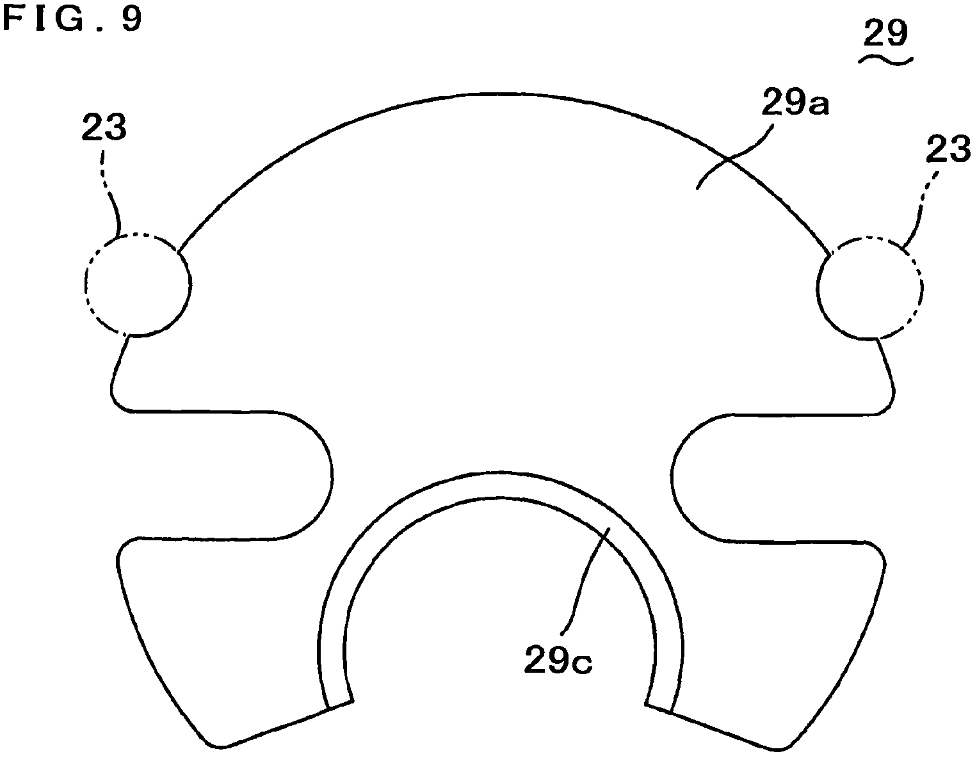
FIG. 9 is a front view of a holder support.
Figure 10:
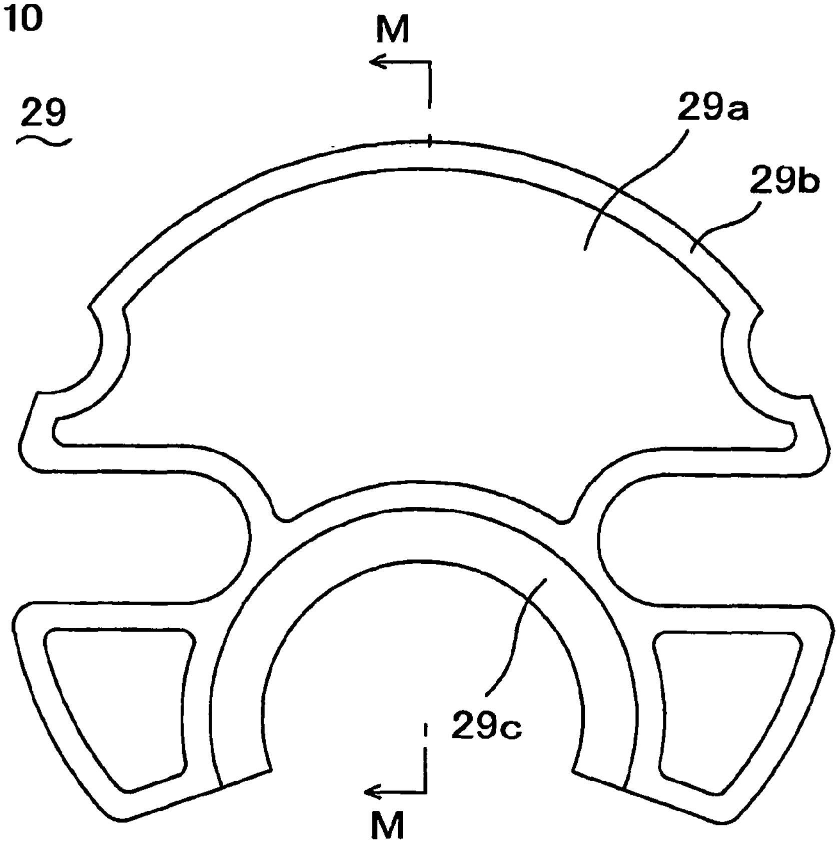
FIG. 10 is a rear view of the same.
Figure 11:
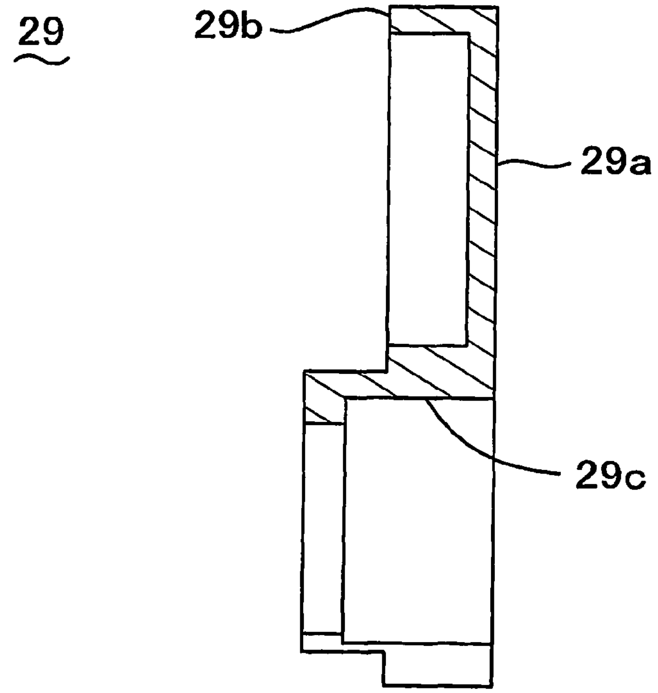
FIG. 11 is a sectional view taken along line M-M of FIG. 10.
Figure 12:
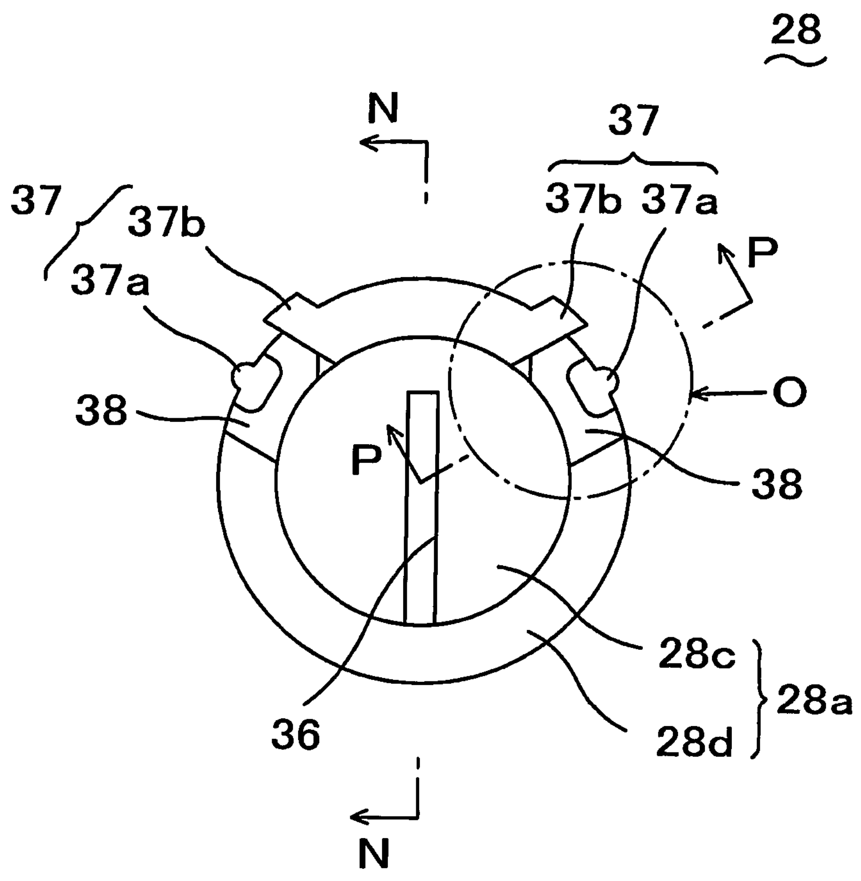
FIG. 12 is a front view of a light receiving unit holder.
Figure 13:
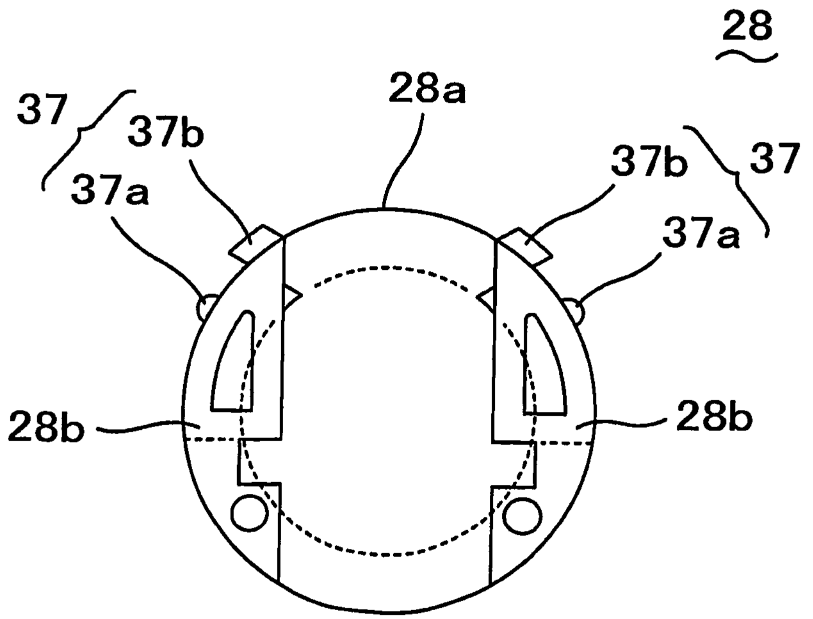
FIG. 13 is a rear view of the same.
Figure 14:
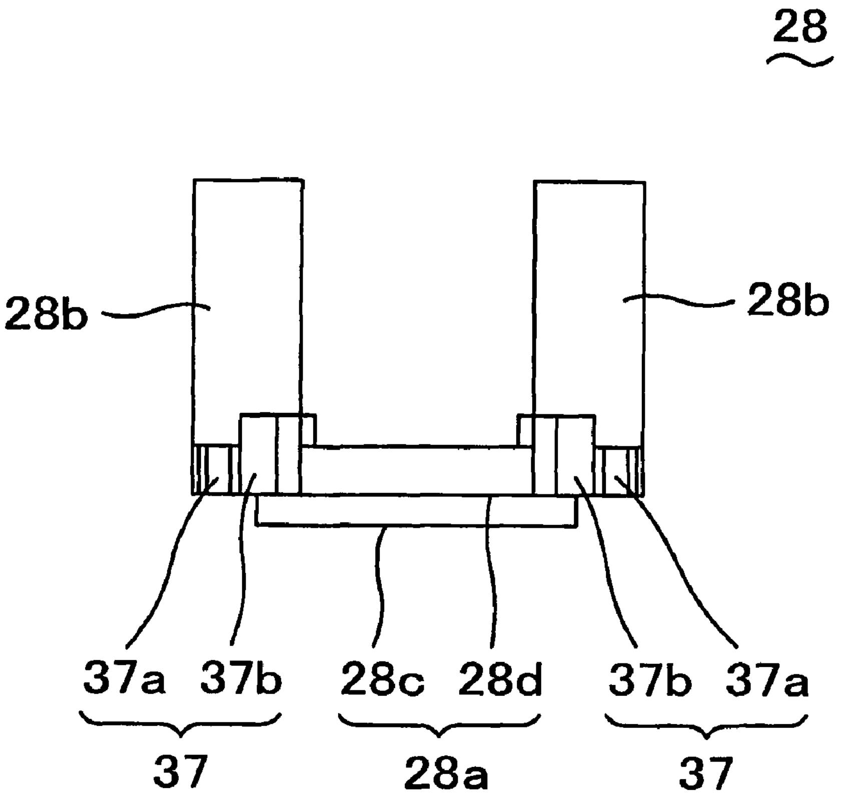
FIG. 14 is a plan view of the same.
Figure 15:
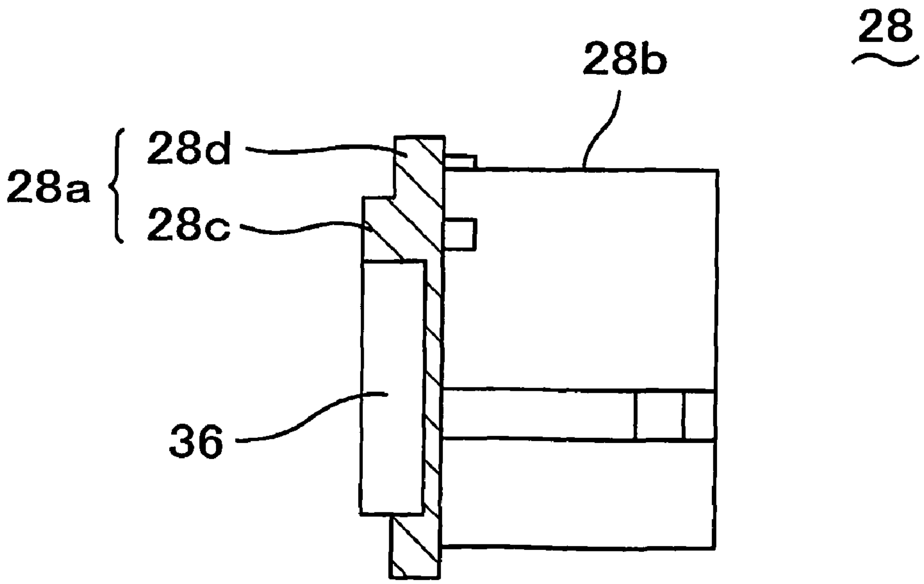
FIG. 15 is a sectional view taken along line N-N of FIG. 12.

The bracket cover 25 has, as shown in detail in FIGS. 6 to 8, a vertically elongated rectangular shape as a whole and has a semicircular shape at a lower portion thereof. The bracket cover 25 has a flange 25*a* formed on its periphery except its lower edge portion and projecting inwardly. The bracket cover 25 has, at its lower end portion, a circular fitting hole 31 formed in the center of the semicircular portion of the bracket cover 25. Also, the bracket cover 25 has, in an inner surface thereof, a pair of protruding bases 32, 32 formed at opposite sides of the fitting hole 31 to protrude smaller than the flange 25*a* and a lug 33 formed right under the fitting hole 31 to project larger than the flange 25*a*, both of which are formed into one body. Each protruding base 32 extends from a location near the fitting hole 31 to the flange 25*a* on the periphery of the bracket cover 25 and has a projecting portion 34 in its inner end portion. The projecting portions 34, 34 are placed on opposite sides of the fitting hole 31, one on each side. Each projecting portion 34 has an upper side edge 34*a* formed to be rounded in a circular arc form and a lower side edge 34*b* forming a cutout of a circular arc form. Also, each protruding base 32 has a retention groove 40 for retaining the light receiving unit cover 35 formed at an outside end portion thereof and corresponding in shape to the retention groove 24 of the limit case 11. The light receiving unit cover 35 of a synthetic resin, which is in a form of a transparent, circular-arc-shaped, light receiving surface, is mounted on a periphery of a lower end portion for a lower edge) of the bracket cover 25 by hooks 35*a*, 35*a* on each side thereof being engaged in the corresponding retention grooves 40 of the bracket cover 25, respectively. The hooks 35*a*, 35*a* are brought into engagement with the corresponding retention grooves 24 of the limit case 11 as well. The light receiving unit 27 is adapted to receive a pulsed optical signal applied from a remote controller through the light receiving unit cover 35 at either of the switched positions in two directions The holder support 29 comprises a flat portion 29*a* of a fan-shaped leave to contact with an inner surface of the side bracket 2R, a flange portion 29*b* which is formed around a periphery of the flat portion 29*a* and a part of which is to contact with an inner surface of the high shoulder portion 18*a* of the limit case 11, and a support portion 29*c* of a semi-cylinder form formed at a lower portion of the flat portion 29*a*, as illustrated in detail in FIGS. 9-11. The support holder 29 is held in sandwich relation between the side bracket 2R and the limit case 11, and the light receiving unit holder 28 for holding the light receiving unit 27 is mounted on the support portion 29*c* of the holder support 29 so that it can pivot about a center point of the light receiving unit cover 35.

Figure 16:
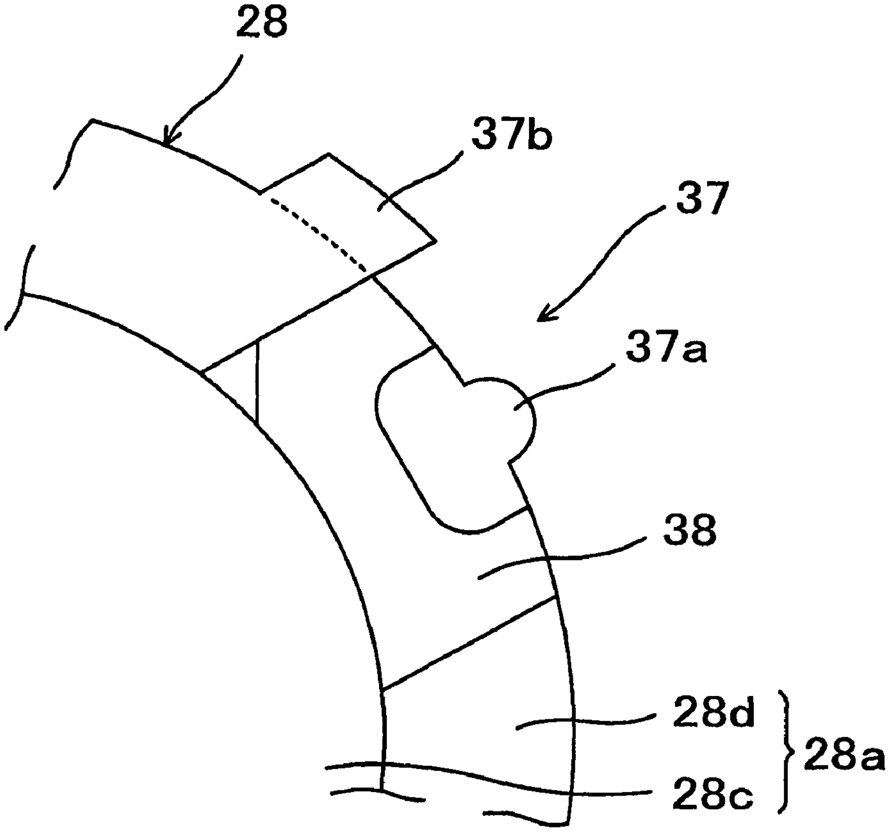
FIG. 16 is an enlarged view around O of FIG. 12.
Figure 17:
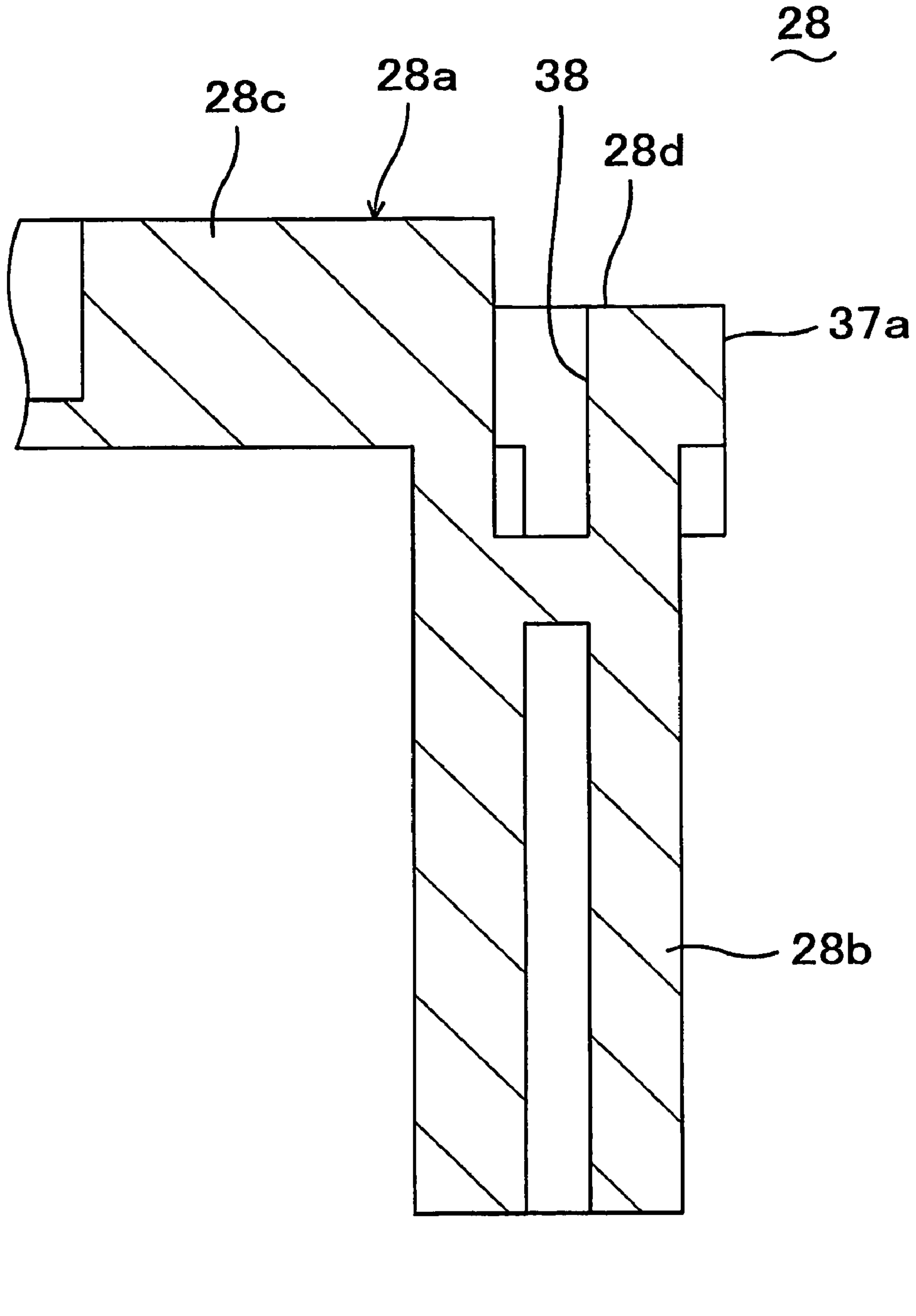
FIG. 17 is an enlarged view taken along line P-P of FIG. 12.

On the other hand, as illustrated in detail in FIGS. 12-15, the light receiving unit holder 28, which comprises an operative surface 28*a* of a disc-like form and a pair of holding portions 28*b*, 28*b* formed on the rear side of the operative surface 28*a* to be spaced apart from and opposed to each other, is structured to hold the light receiving unit 27 in sandwich relation between the pair of holding portions 28*b*, 28*b*. The operative surface 28*a* of the light receiving unit holder 28 is formed so that its central portion 28*c* and its periphery 28*d* are concentrically disposed at different levels so that the central portion 28*c* can be above the level of the periphery 28*d*. Also, the light receiving unit holder 28 is held between the bracket cover 25 and the holder support 29 in a freely rotational manner in the state of the central portion 28*c* of the operative surface 28*a* extending through the fitting hole 31 of the bracket cover 25 and facing outside. The operative surface 28*a* of the light receiving unit holder 28 has an operating slot 36, formed on a center line of the central portion 28*c* of the light receiving unit holder 28, for rotationally operating the light receiving unit holder 28. Also, the periphery 28*d* of the operative surface 28*a* of the light receiving unit holder 28 has two holding portions 37, 37, one on each side of the center line of the central portion 28*c*, which are formed to project radially outwardly and correspond in position to the projecting portions 34 of the bracket cover 25. As illustrated in detail in FIGS. 16 and 17, each holding portion 37 comprises a first holding lug 37*a* having radial flexibility provided by forming a U-shaped cutout 38 around it and a second holding lug 37*b* having no flexibility and located nearer to the center line of the central portion 28*c* than the first holding lug 37*a*. And, the holding portions 37, 37 are structured so that when the light receiving unit 27 is changed in light receiving direction by operating the light receiving unit holder 28 rotationally, the first holding lug 37*a* of one of the holding portions 37, 37 is, first, brought into contact with the corresponding projecting portion 34 of the bracket cover 25 and is bent radially inwardly to allow relative rotation and shift of the projecting portion 34 and, then, the second holding lug 37*b* is brought into contact with that projecting portion 34 to prevent the relative rotation and shift of the projecting portion 34, while at the same time as that, the projecting portion 34 is held in sandwich relation by the first holding lug 37*a* and the second holding lug 37*b*, to maintain the changed light receiving direction of the light receiving unit 27 (Cf. FIG. 5)

As described above, in the electric roll screen A for blind, the light receiving unit 27 mounted on the one side bracket 2R supporting the take-up pipe 1 is arranged so that it can be switched to two different orientations where the light receiving directions are different from each other at a predetermined angle with respect to a vertically downward direction. Hence, even when the electric roll screen A is set in reverse under interior layout constraint and the like, the light receiving unit 27 can be changed in light receiving direction and thereby it can be oriented toward the inside of the room as normal. Thus, irrespective of the installation constraint of the electric roll screen A, the electric roll screen A can be remote-controlled by the remote controller even from a location in the room spaced apart from it, thus enhancing convenience.

In addition, since the light receiving unit 27 is only switched in two directions to change or switch the light receiving direction, the structure for the direction change can be relatively simplified, thus facilitating to practice.

In the illustrated embodiment, in particular, since the motor 5 is placed in the take-up pipe 1 and also is supported by the side bracket 2R through the limit case 11, the structure around the side bracket 2R including the bracket cover 25 can be reduced in thickness, as compared with the structure wherein the motor 5 is mounted on the side bracket 2R. This can contribute to installation-space-saving and thus enhancement of versatility.

In addition, since the light receiving unit holder 28 is rotatably mounted on the bracket cover 25 fixed to the outside surface of the side bracket 2R and also the light receiving unit 27 held by that light receiving unit holder 28 is structured so that it can constantly receive a pulsed optical signal applied from the remote controller through the transparent, circular-arc-shaped, light receiving unit cover 35 mounted on the lower end of the bracket cover 25, irrespective of the change of the light receiving direction, the light receiving unit 27 can be protected by the light receiving unit cover 35. Also, sensitivity of the light receiving unit 27 is not varied by the change in the light receiving direction of the light receiving unit 27, thus enhancing reliability.

In addition, the light receiving direction of the light receiving unit 27 can be easily switched with for example a driver and the like which is inserted in the operating slot 36 formed in the central portion 28*c* of the operative surface 28*a* of the light receiving unit holder 28 extending through the fitting hole 31 of the bracket cover 25 and facing outside and is operated rotationally, thus contributing to simplification of the installation operation.

Further, when the light receiving direction of the light receiving unit 27 is switched by operating the light receiving unit holder 28 rotationally, even when it is changed to any lateral side of the opposite sides of the vertically downward direction, as viewed in FIG. 5, the projecting portion 34 on the bracket cover 25 side is always held in sandwich relation by the first holding lug 37*a* and the second holding lug 37*b* of the holding portion 37 located on the light receiving unit holder 28 side and the light receiving direction of the light receiving unit 27 switched is maintained. Thus, the direction change operation of the light receiving unit 27 can be done easily and reliably.

The present invention covers various modifications without being limited to the embodiment described above. For example, while in the above-described embodiment, the motor 5 is placed in the take-up pipe 1 and also is supported by the side bracket 2R through the limit case 11, the present invention may be modified so that the motor can be mounted on other member than the take-up pipe 1, for example either one of the side brackets 2L, 2R.

Also, while in the above-described embodiment, the light receiving unit 27 is indirectly mounted on the side bracket 2R via the bracket cover 25 and the like to cover the outside surface of the side bracket 2R, the present invention may be of course modified so that the light receiving unit 27 can be directly mounted on the side bracket 2R.

The invention claimed is:

1. A remote-controlled light receiving structure of an electric roll screen for blind which is structured so that a take-up pipe placed along an upper edge of a window of a building is rotatably supported at both ends there of by side brackets, while an upper end of the screen having a weight bar attached to a lower end there of, is fixed to the take-up pipe, so that the take-up pipe is rotated in forward and reverse directions by a motor to wind up and down the screen, wherein a bracket cover is mounted on an outer surface of one of the side brackets and has, at a lower end thereof, a transparent, circular-arc-shaped, light receiving surface separate from or part of the bracket cover, and a light receiving unit to receive a pulsed optical signal applied from a remote controller through the light receiving surface is mounted through a light receiving unit holder, and wherein the light receiving unit holder is mounted on the bracket cover so that it can pivot about a center point of the circular-arc-shaped light receiving surface, and the light receiving unit is arranged so that it can be rotated together with the light receiving unit holder so that it can be switched to two different orientations where the light receiving directions are symmetric with respect to a vertically downward direction and the phases are different from each other.

2. The remote-controlled light receiving structure of the electric roll screen for blind according to claim 1, wherein the motor is placed in the take-up pipe and also is supported by one of the side brackets through a limit case, and one end portion of the take-up pipe is supported to be freely rotatable around an outside surface of the limit case.

3. The remote-controlled light receiving structure of the electric roll screen for blind according to claim 1, wherein the light receiving unit holder has one end surface formed to extend through a fitting hole formed in the bracket cover and face outside and also has an operating slot formed in the one end surface for rotationally operating the light receiving unit holder.

4. The remote-controlled light receiving structure of the electric roll screen for blind according to claim 3, wherein the bracket cover has, in an inner surface thereof, projecting portions formed at two locations on opposite sides of the fitting hole, one on each side, and the light receiving unit holder has two holding portions formed to correspond to the projecting portions, respectively, each holding portion comprising a first holding lug having flexibility and a second holding lug having no flexibility and being structured so that when the light receiving unit is changed in light receiving direction by operating the light receiving unit holder rotationally, the first holding lug of one of the holding portions is brought into contact with the corresponding projecting portion of the bracket cover and is bent to allow relative rotation and shift of the projecting portion, first, and, then, the second holding lug is brought into contact with that projecting portion to prevent the relative rotation and shift of the projecting portion, while at the same time as that, the projecting portion is held in sandwich relation by the first holding lug and the second holding lug, to maintain the change light receiving direction of the light receiving unit.

* * * * *